SPEECH ANALYSIS THROUGH FORMANT DETECTION

Filed Sept. 14, 1967 4 Sheets-Sheet 1

INVENTORS
HOWARD W. COTTERMAN
JOHN H. KING, JR.
BY Andrew Taras
AGENT

SPEECH ANALYSIS THROUGH FORMANT DETECTION

Filed Sept. 14, 1967 4 Sheets-Sheet 2

SPEECH ANALYSIS THROUGH FORMANT DETECTION

Filed Sept. 14, 1967 4 Sheets-Sheet 3

SPEECH ANALYSIS THROUGH FORMANT DETECTION

Filed Sept. 14, 1967

United States Patent Office 3,499,989
Patented Mar. 10, 1970

3,499,989
SPEECH ANALYSIS THROUGH FORMANT DETECTION

Howard W. Cotterman, Gaithersburg, Md., and John H. King, Jr., Endwell, N.Y., assignor to International Business Machines Corporation, Armonk, N.Y., a corporation of New York Filed Sept. 14, 1967, Ser. No. 667,681
Int. Cl. G10l *1/00*
U.S. Cl. 179—1 8 Claims

ABSTRACT OF THE DISCLOSURE

A stable logic circuit combined with phase shift filters which are all-pass networks having a transfer function with constant magnitude and frequency dependent phase. The input speech wave is applied to both a reference limiter which supplies a square wave output and a plurality of phase filter and limiter combinations which supply phase shifted square wave outputs. The output of the reference limiter and the output of an individual phase filter and limiter combination are supplied to a distinct quadrant detector. The resultant outputs of the plurality of quadrant detectors are a function of the frequency phase relationship.

BACKGROUND

When speech sounds are electrically analyzed, the formant detection apparatus results in some form of spectrum analysis having a dynamic range of about 40 db and in which the speech signal is comprised of several highly damped poles. The most noteworthy analysis techniques utilize conventional band pass filters which result in rather complex circuits in order to provide the relative maximum detection imposed by the wide dynamic range.

SUMMARY

The present invention offers a simple and compact method for detecting speech formants for purposes of limited speech recognition in a limited vocabulary of English words.

Since human speech can be characterized by a three-dimensional relationship of time, amplitude (volume) and frequency, a two-dimensional approach utilizing frequency vs. time forms the basis of the present invention to detect the relative amplitude maxima, known as formants, in the limited speech vocabulary. By combining a stable logic circuit network with phase shift filters formed from an all-pass network having a transfer function with constant magnitude and frequency dependent phase, the output is limited to exclude the 40 db speech amplitude variation by comparing the output, by means of a logic AND gate network, with the limited speech signal to provide a rectangular wave having a duty cycle which is a function of the frequency of the speech input signal.

It is the principal object of the invention to provide a relatively simple and compact system for detecting formants in speech sounds for recognition purposes.

Another object is to provide a simple network including phase shift filters whereby detection of formants is simply and economically achieved for a limited vocabulary of English words.

Yet another object is to provide an economical formant detection system in a limited vocabulary by utilizing a unique technique to eliminate the wide speech amplitude variations in the speech spectrum.

The foregoing and other objects, features and advantages of the invention will be apparent from the following more particular description of a preferred embodiment of the invention, as illustrated in the accompanying drawings.

DESCRIPTION OF PREFERRED EMBODIMENT

Figure 1:
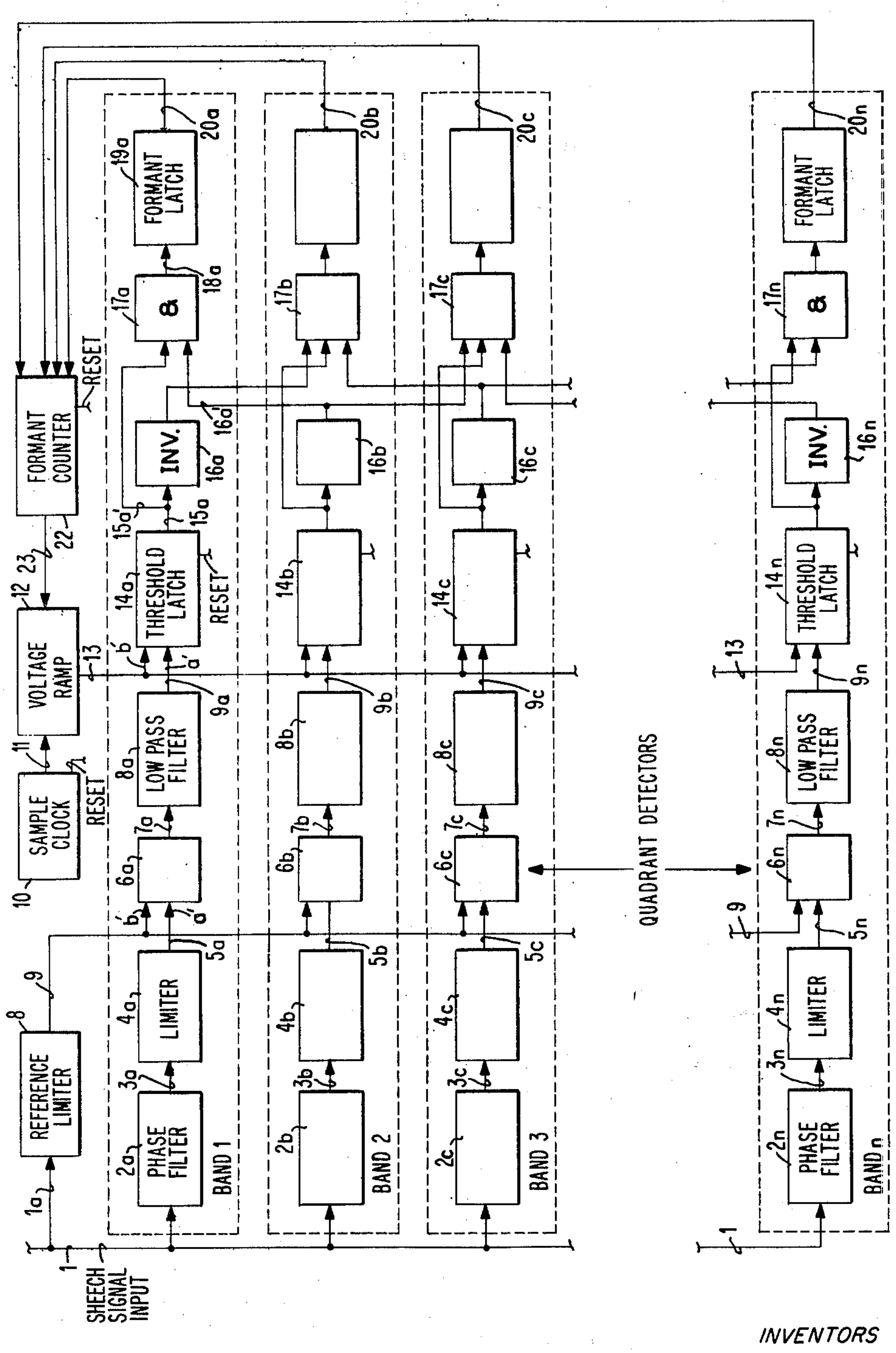
FIG. 1 shows a schematic arrangement of the formant detection system.

Referring to FIG. 1, the invention comprises a network for analyzing the speech signal which is transmitted over a line 1 to a plurality of phase shift filter networks 2*a*–2*n*. The outputs from these networks are passed on to a plurality of limiters 4*a*–4*n* by way of output lines 3*a*–3*n*. Outputs from the limiters 4*a*–4*n* are applied to quadrant detectors 6*a*–6*n* by way of output lines 5*a*–5*n*. Each quadrant detector has two inputs *a'* and *b'* which, if energized concurrently with appropriate signal levels, provide an appropriate output signal. Output signals from these qaudrant detectors are applied to output lines 7*a*–7*n*. An inpection of FIG. 1 reveals that the *b'* inputs to the detectors 6*a*–6*n* are connected in common to an output line 9 which is connected to a reference limiter 8 to which the speech signal is also fed by way of line 1*a*. The output lines 7*a*–7*n* are connected to a plurality of low pass filters 8*a*–8*n* whose outputs are interconnected through lines 9*a*–9*n* to coincidence type threshold latches 14*a*–14*n*, each provided with two inputs *a'* and *b'* which, if energized coincidentally, enable the latch to turn from an OFF state to an ON state. The *a'* inputs of these latches are connected to the output lines 9*a*–9*n*. The *b'* inputs of the latches are connected in common to an output line 13 which is connected to a voltage ramp 12 having its input connected to a line 11 in turn fed by the output of a sample clock 10. The outputs from the threshold latches 14*a*–14*n* are fed to inverters 16*a*–16*n* by way of lines 15*a*–15*n* and also to coincidence devices (AND circuits) 17*a*–17*n* by way of lines 15*a'*–15*n'*. The coincidence devices 17*a*–17*n* have each three inputs, except devices 17*a* and 17*n* which have two inputs each. The outputs from the inverters, except for the first and last ones, are passed on to an adjacent pair of the AND devices 17*a*–17*n*. For example, the output of inverter 16*b* is fed to both AND devices 17*a* and 17*c* by way of line 16*a'*. From an inspection of these outputs, it may be realized that any one of the AND devices 17*a*–17*n*, except for the first and last ones, will be energized providing its immediately adjacent ones are not energized, the above arrangement constituting a measuring circuit for extracting the maximum formant energy present in adjacent bands of the speech spectrum. Outputs from the AND devices 17*a*–17*n* are transmitted by way of lines 18*a*–18*n* to formant latches 19*a*–19*n* which are energized when the appropriate signals appear on the lines 18*a*–18*n*. Outputs from the formant latches 19*a*–19*n* are passed on to lines 20*a*–20*n* connected to a formant counter 22 which supplies an output, after a predetermined count, to a line 23 in turn connected to the voltage ramp 12. The signals on lines 23 and 11 are utilized to control operations of the voltage ramp 12.

The operation of the foregoing system may be described as follows: The formant detection system consists of a number $n$ of the phase networks 2*a*–2*n*, the number $n$ depending on the band width of each network and the desired width of the speech spectrum to be analyzed for formants. A minimum of 15 networks (bands) are utilized in a practical embodiment for a speech spectrum band width of 3 kc.

Figure 2A:
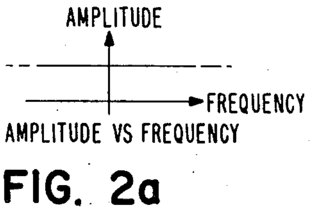
FIGS. 2*a* and 2*b* show the transfer function of an ideal all-pass network.
Figure 2B:
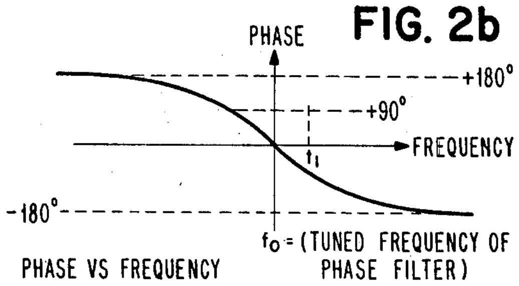
Figure 3:
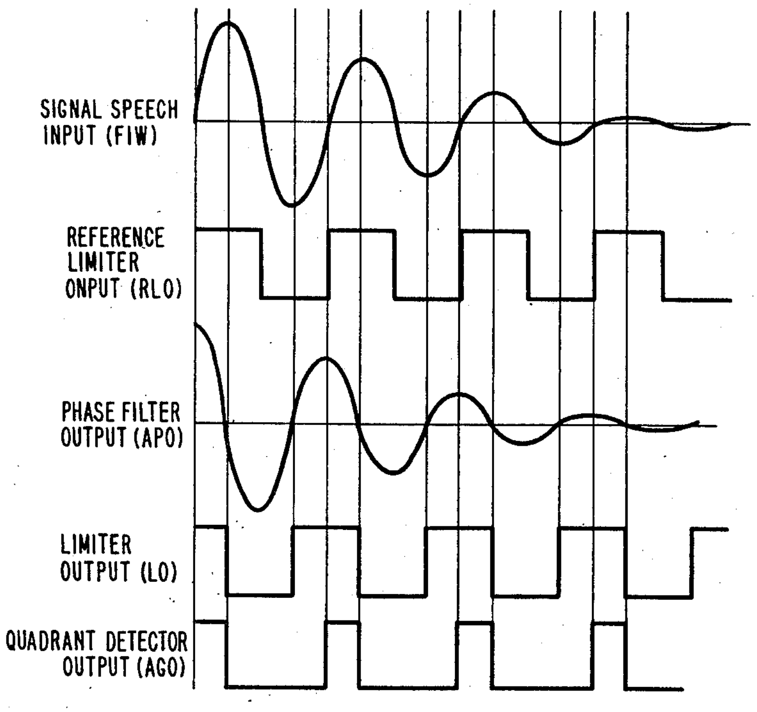
FIG. 3 shows several input/output waveforms depicting the operation of a phase filter.
Figure 4:
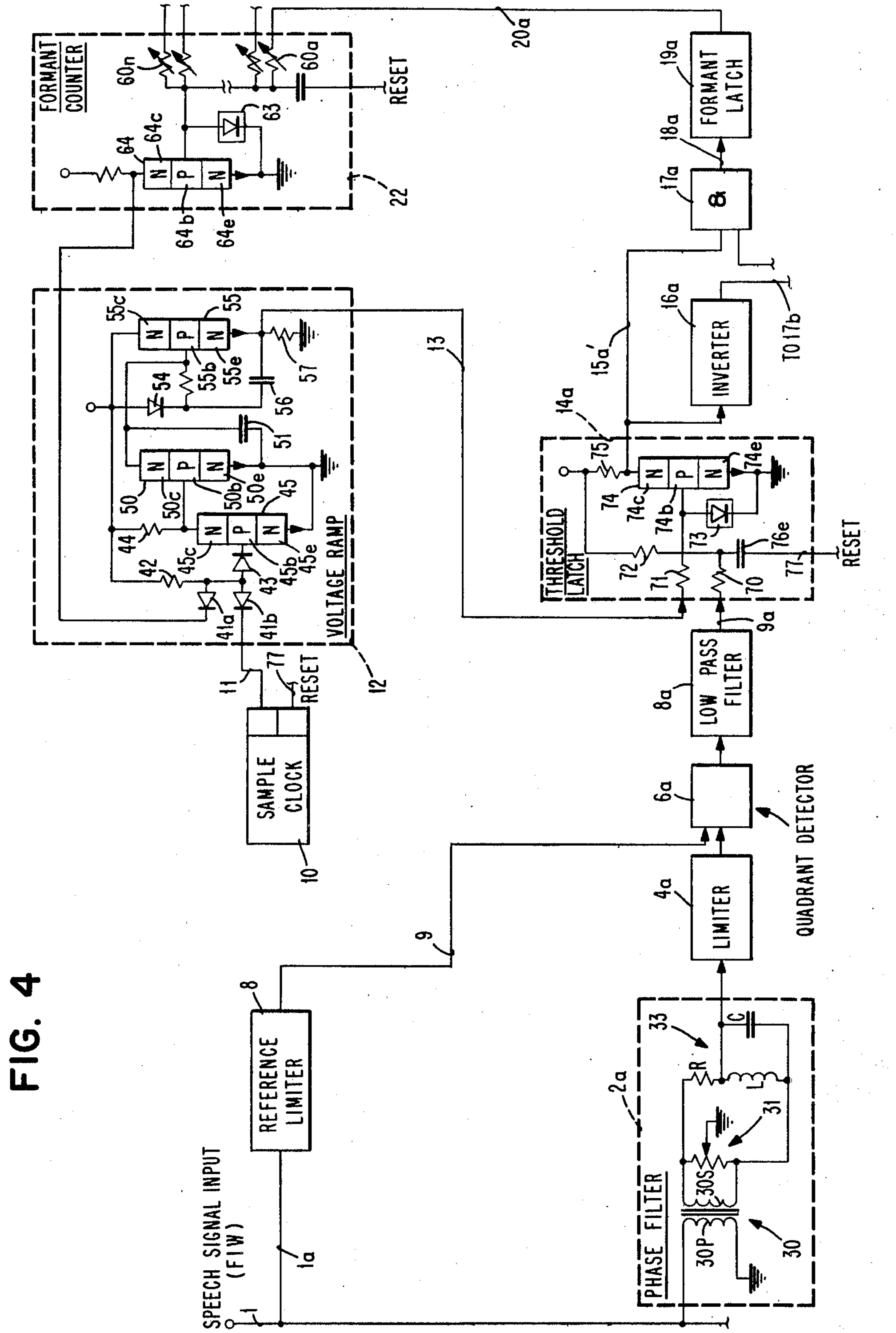
FIG. 4 shows details of a spectrum band in the arrangement of FIG. 1.
Figure 6A:
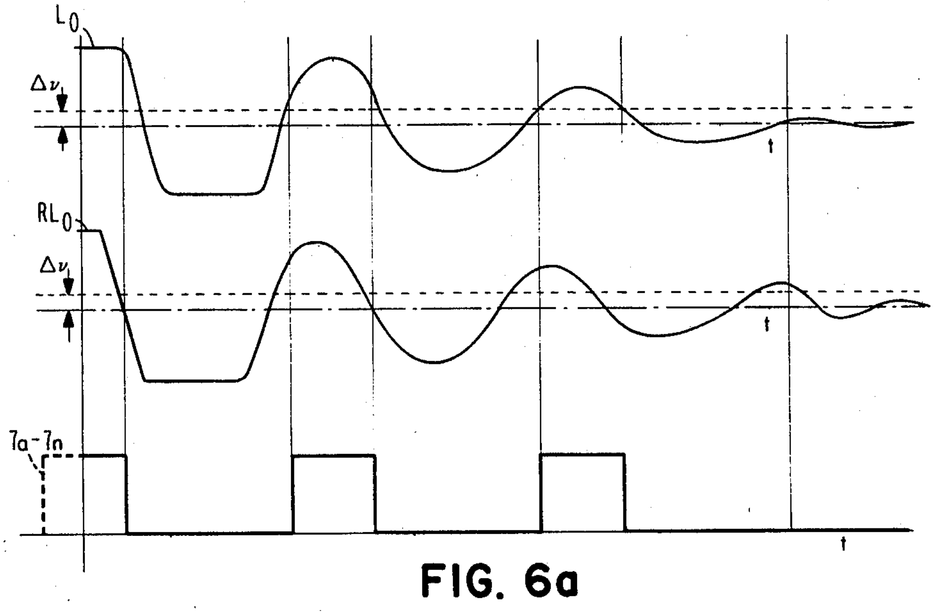
FIG. 6*a* illustrates typical input and output waveforms of the quadrant detectors.
Figure 6B:
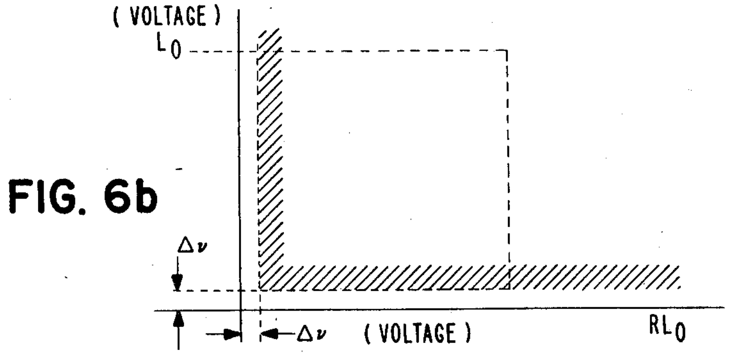
FIG. 6*b* illustrates the spatial relationship of voltages $L_0$ and $RL_0$ in the first quadrant.

The phase filter as seen in FIG. 4 comprises a transformer 30 having its primary 30P connected between the speech signal input line 1 and ground, and a secondary winding 30S connected across a potentiometer 31 with the latter being connected to an RLC network 33. The potentiometer 31 is used to balance the secondary winding 30S in the presence of the network 33 load which results in the flat amplitude vs. frequency response characteristic shown in FIG. 2*a*. The RLC network 33 provides the characteristic phase shift response depicted in FIG. 2*b* and in which the LC parameters are chosen to render the network resonant at the desired center frequency. The phase relationship between an input signal FIW and the output APO of the phase filter is shown in FIG. 3. The out-of-phase signal applied to the limiter 4*a*, shown in FIG. 4, appears as an output square wave $L_0$ also seen in FIG. 3. This waveform $L_0$ is applied to one input of the quadrant detector 6*a* while the output waveform $RL_0$ from the reference limiter 8 is applied to the other input of the quadrant detector. Both of these square waveforms $L_0$ and $RL_0$ may or may not be in phase depending upon the relationship of the incoming speech waveform and the tuned frequency of the appropriate filters. The measure of time coincidence between the waveforms $L_0$ and $RL_0$ is determined by the quadrant detectors 6*a*–6*n* whose outputs are a function of frequency phase relationships as may be seen from an inspection of FIGS. 6*a* and 6*b*. The detection of formants is achieved by first passing the outputs of the detectors 6*a*–6*n* through the low pass filters 8*a*–8*n* and measuring the low pass filtered outputs against the voltage output from the voltage ramp 12, the latter achieving its maximum voltage within a time period of about 10 microseconds within which time certain ones of the low pass filter outputs will be at a predetermined level sufficient to energize appropriate ones of the threshold latches 14*a*–14*n*. From an inspection of the circuitry interconnecting the latches 14, the inverters 16 and the AND gates 17 it will be realized that only one AND gate out of a group of three gates situated side by side can be energized. Depending upon the total number of AND gates within the system configuration, only a limited number of AND gates, during a speech interval, will be energized to in turn energize the associated formant latches 19*a*–19*n* indicating the presence of an appropriate number of detected formants. These detected formants are passed on to the formant counter 22 which is adjusted to count from 1 to several formants, depending upon the desired number required (usually three), after which the counter resets to zero and cuts off the voltage ramp 12 to generate another cycle of operation at a rate determined by the repetition rate (typically 30 hz.) of the sample clock 10.

While under given conditions, the number of principal vocal tract resonances is limited to three, there are conditions under which the primary resonances may be accompanied by the presence of several weaker (more highly damped) resonances. Under these conditions the system must be capable of selecting only the principal resonances.

The two voltages $RL_0$ and $L_0$ can be though of as being the two components of a vector $\overline{V}$. Thus, the instantaneous pair of values (taken simultaneously) of the two voltages give the Cartesian coordinates of a point (vector) in a two-dimensional space.

Figure 6C:
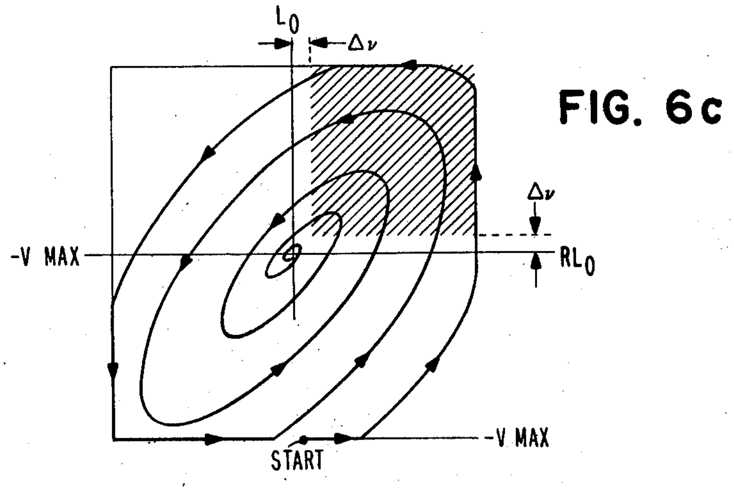
FIG. 6*c* shows the trajectory of the vector representing component voltages $RL_0$ and $L_0$.

The quadrant detector circuit is so designed that its output voltage is in one of two stable states (in this case the upper) when $RL_0$ and $L_0$ simultaneously exceed some arbitrary value ($\Delta v$). Otherwise, its output exists in the opposite stable state (the lower). Since the outputs $RL_0$ and $L_0$ are essentially damped sinusoids, having a peak value limited to some amount greater than $\Delta v$ ($\Delta v < V_{max}$) and a relative phase shift which is a function of the frequency difference between the center frequency of the all-pass network and the resonant frequency of the vocal tract, the trajectory of the vector representing the simultaneous values of the true voltages $RL_0$ and $L_0$ describes a generally elliptically shaped spiral path as shown in FIG. 6*c*. Whenever the vector is wtihin the shaded region of the two dimensional space, the output of the quadrant detector is in the upper of the two stable states; otherwise, the output of the quadrant detector is in the lower of the two stable states. This provides the quadrant detectors 6*a*–6*n* with an effective threshold level below which the detectors become insensitive to the damped resonances of the vocal tract decay and successively cease to switch.

Thus, the average switching duty cycle of any particular quadrant detector will be proportional to the frequency difference between the formant frequency and the center frequency of the all-pass phase shift network, the damping of the formant and the absolute intensity of speech signal. To facilitate an understanding of the operation of the quadrant detector, reference is invited to FIGS. 6*a* and 6*b* wherein the two damped waveforms $L_0$ and $RL_0$ are shown with a small relative phase shift $\Delta v$. Initially, it will be observed that the duty cycle is constant and only a function of the relative phase. However, after the two waveforms (voltages) have damped out to the point where the two waveforms no longer excede a peak value of $\Delta v$ simultaneously the duty cycle abruptly drops to zero, the process repeating for each period of the glottal vibrator. The time average of the duty cycle is obtained by low pass filtering the output waveform of the quadrant detector by means of the low pass filters 8*a*–8*n*. Thus, the location of the frequency of a formant will still be indicated by a relative maximum voltage appearing at the output of a low pass filter and in addition the strengthening or damping of any one formant can be compared to the strength or damping of any other formant, in a relative sense, by observing the differences in the appropriate two relative maximum voltages on lines 8*a*–8*n*. Any number of principal formants (indicated by relative maxima) may be selected by picking the highest $m$ out of $n$ of the relative maximum outputs on lines 8*a*–8*n* by means hereinafter described. By virtue of this unique technique, the ability to make a distinction amoung a number of formants in terms of their relative damping and/or strength is achieved in a system which otherwise is still insensitive to absolute signal amplitude.

The voltage ramp 12 comprises essentially an AND circuit 40 and transistors 45, 50 and 55 connected in the circuit configuration shown. The voltage ramp functions primarily as a sweep circuit. The AND circuit is constituted of input diodes 41*a* and 41*b*, a resistor 42 and a diode 43 connected to the base 45*b* of the transistor 45, the collector 45*c* being connected to a positive voltage supply V+ by way of resistor 44, which the emitter 45*e* is connected to ground. The collector 45*c* is further connected to the base 50*b* of transistor 50 whose emitter 50*e* is connected to ground. A capacitor 51 is connected between the collector 50*c* and emitter 50*e*. At a given interval of time transistors 45 and 50 assume opposite states; that is, when transistor 45 is ON transistor 50 is OFF and vice versa. When both signal levels to the input diodes 41*a* and 41*b* are down, the transistor 45 assumes an ON state and transistor 50 an OFF state. Under this condition capacitor 51 charges by way of a path including line 52, transistor 53 and a diode 54, the resistor 53 along with capacitor 51 providing the charging time constant for the voltage ramp 12. Transistor 55 along with resistor 57 form the output emitter follower stage of the voltage ramp 12. Capacitor 56 provides the energy necessary to activate the transistor 55 and ultimately provides saturation for the transistor. Diode 54 provides a charging path for the capacitor 56 during time intervals when the voltage ramp 12 is off. When signal inputs to the diodes 41*a* and 41*b* are at an up level, transistor 45 is OFF and transistor 50 is ON to cause capacitor 51 to discharge.

The formant counter 22 serves primarily as a latch and employs a tunnel diode 63 interconnected between the base 64*b* and emitter 64*e* of transistor 64. Outputs from the formant latches 19*a*–19*n* enter the formant counter 22 by way of lines 20*a*–20*n* and summing resistors 60*a*–60*n* which are connected in common to a line 61 feeding the base 64*b* of transistor 64. The collector 64*c* applies its output to the line 23 connected to the input diode 41*a* of the voltage ramp 12. The other input diode 41*b* of the voltage ramp is fed by the line 11 connected to the sample clock 10. The summing resistors 60*a*–60*n* are each adjusted to appropriate resistance values to provide the switching current for the tunnel diode 63 influenced by the outputs from a desired number of energized formant latches.

Each of the threshold latches 14*a*–14*n* is constituted of a tunnel diode 73 connected across the base 74*b* and emitter 74*e* of transistor 74. Input to this configuration is by way of summing resistors 70 and 71 in turn connected respectively to the low pass filter output line 9*a* and the output line 13 extending from the voltage ramp 12. Resistor 75 serves as the collector load for the transistor 74 and resistor 72 provides a stauration bias supply for the transistor. Capacitor 76 and line 77, connected to the sample clock 10, provides a reset path for the latch. Summing transistors 70 and 71 are chosen to provide the appropriate current to switch the tunnel diode at a desired threshold level which when reached, by virtue of the summing resistors including resistor 72, causes the tunnel diode and transistor to switch (i.e., to turn ON).

Figure 5:
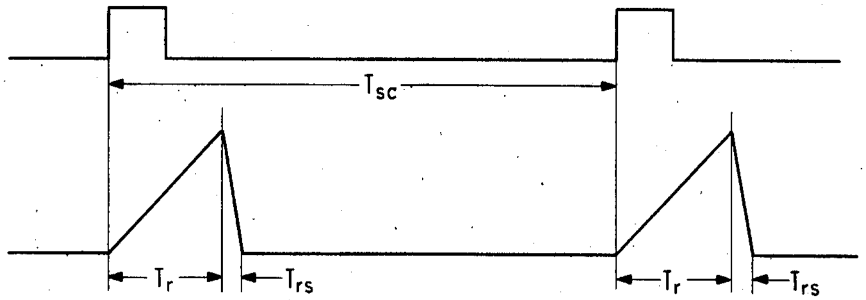
FIG. 5 shows the relationship of the ramp cycle to the clock cycle.

A definite relationship is maintained between the period of the sample clock and the rise time of the voltage ramp; i.e., the rise time plus the time required to reset the ramp must be shorter than one period of the sample clock, as illustrated in FIG. 5, wherein:

$T_{sc}$=period of sample clock $T_r$=rise time of voltage ramp on line 13

$T_{rs}$=reset time of voltage ramp on line 13

The period of the sample clock is in turn dictated by the cutoff frequency of the low pass filters 8*a*–8*n*. It has been experimentally determined that a cutoff frequency between 15 hz. and 25 hz. is adequate with normal speech signals if the attenuation rate in the stop band is −12 db. per octave. Thus with a low passcutoff of 15 hz. a sample clock period of 30 ms. or less is sufficient to detect any significant changes in the status of the relative maximum voltages on lines 9*a*–9*n*.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A speech waveform analyzing system for detecting formants in the speech spectrum, comprising:
- a plurality of phase shift filters each supplied with the speech waveform and each tuned to a particular frequency band of the spectrum to provide an output phase which is a function of the frequency of the speech waveform;
- a plurality of limiters, one for each phase shift filter, and each supplying a substantially limited wave output;
- a reference limiter responsive to the speech waveform to provide a reference limited wave output;
- a plurality of quadrant detectors, each jointly responsive to an associated limited wave output and the reference wave output, to provide appropriate time coincidence outputs;
- a plurality of low pass filters responsive to said time coincidence outputs to provide DC components indicative of the speech energy presence in the spectrum;
- a voltage ramp providing a periodic sweep voltage;
- and a formant detecting circuit responsive jointly to said sweep voltage and said DC components to provide formant energy representing signals present in the speech spectrum.

2. A system as in claim 1 in which said formant detecting circuit is constituted of latches having adjustable threshold value setting means.

3. A system as in claim 2 further including a measuring circuit interconnecting said latches to detect the maximum speech energy present in adjacent bands of the speech spectrum.

4. A system as in claim 3 further including a formant counter for indicating the desired number of formants detected during a periodic sweep by said voltage ramp.

5. A system as in claim 4 including means for controlling the operation of said voltage ramp under control of said formant counter.

6. A system as in claim 5 further including a clock and means for initiating operation of said voltage ramp jointly under control of said formant counter and said clock.

7. A system as in claim 1 in which said quadrant detectors are responsive to specified threshold levels of said limited wave outputs.

8. A system as in claim 7 in which said specified levels are of a character that render said quadrant detectors responsive to voltage components whose amplitudes simultaneously exceed a threshold Δv.

References Cited

UNITED STATES PATENTS 3,278,685 10/1966 Harper -------------- 179—1

KATHLEEN H. CLAFFY, Primary Examiner

J. B. LEAHEEY, Assistant Examiner